United States Patent [19]

Shoemaker

[11] Patent Number: 5,202,032
[45] Date of Patent: Apr. 13, 1993

[54] METHOD OF REMOVING AND RECOVERING HYDROCARBONS FROM HYDROCARBON/WATER MIXTURES

[75] Inventor: D. Dennis Shoemaker, Findlay, Ohio
[73] Assignee: Marathon Oil Company, Findlay, Ohio
[21] Appl. No.: 689,384
[22] Filed: Apr. 22, 1991
[51] Int. Cl.$^5$ ............................................. B01D 17/035
[52] U.S. Cl. ............................... 210/718; 210/702; 210/767; 261/76
[58] Field of Search ........... 210/742, 739, 702, 767, 210/774, 718; 261/76, 122, DIG. 75, 124

[56] References Cited

U.S. PATENT DOCUMENTS

| | | | |
|---|---|---|---|
| 3,841,997 | 10/1974 | McGee | 261/122 |
| 4,564,447 | 1/1986 | Tiedemann | 210/220 |
| 4,781,811 | 11/1988 | Mankut et al. | 261/122 |
| 4,892,664 | 1/1990 | Miller | 210/747 |
| 4,960,443 | 10/1990 | Lansford | 210/718 |
| 5,004,484 | 4/1991 | Stirling et al. | 210/767 |
| 5,030,362 | 7/1991 | Da Silva et al. | 261/122 |

Primary Examiner—Robert A. Dawson
Assistant Examiner—David Reifsnyder
Attorney, Agent, or Firm—Jack L. Hummel; Jack E. Ebel

[57] ABSTRACT

A method for removing and recovering hydrocarbons contained in hydrocarbon/water mixtures. Hydrocarbons are stripped from nonflowing hydrocarbon/water mixtures in a tank by bubbles of inert gas or air introduced under pressure. The inert gas or air and hydrocarbons are vented from the tank and the water is removed from the tank when satisfactorily purified. The material in the tank preferably is heated. A two-tank process may be used wherein the second tank is filled while the stripping process in the first tank is taking place. The rate of flow of the inert gas or air is maintained at a low enough rate to allow recovery of product.

1 Claim, 1 Drawing Sheet

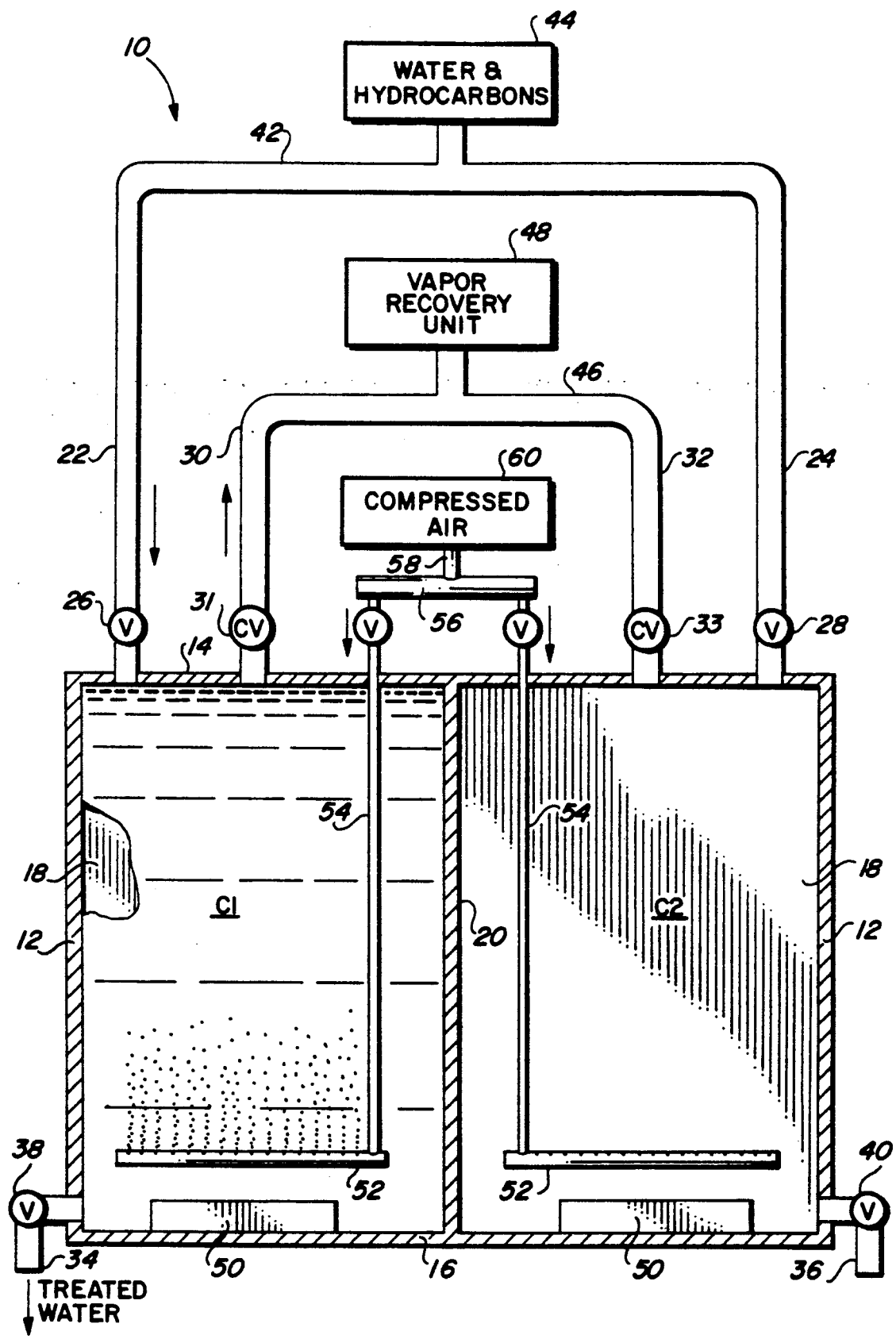

METHOD OF REMOVING AND RECOVERING HYDROCARBONS FROM HYDROCARBON/WATER MIXTURES

FIELD OF THE INVENTION

This invention relates to a petroleum product recovery system. More particularly, it relates to a process for removing and recovering hydrocarbons from mixtures of hydrocarbons and water.

BACKGROUND OF THE INVENTION

The production and handling of petroleum products often produces mixtures of product and water containing large amounts of dissolved or entrained hydrocarbons. For example, water removed from static separator tanks employed to separate oil from mixtures of oil and water can contain such high levels of hydrocarbons that, if discarded, it would be considered a hazardous waste, and could not be disposed of without further treatment. Further, if discarded, the dissolved or entrained petroleum is lost.

The treatment of such water can be quite expensive. When treated off-site, the required hauling and treatment process is costly. When treated on-site, the cost of hauling is eliminated, but the installation and operation of separate treatment units fed from holding tanks can also be very costly. In either case valuable hydrocarbon compounds in the water are destroyed by the treatment process.

Treatment processes have been suggested which will separate hydrocarbons from water. One example is disclosed in U.S. Pat. No. 4,564,447, wherein contaminated water is caused to flow in a shallow stream over perforated pipes through which air is bubbled. By this means, the air entrains and removes the contaminating dissolved solvent. Another example is disclosed in U.S. Pat. No. 4,892,664, wherein contaminated water is pumped from a well to the top of a packed column. While the water travels down the column, air is blown up through it, stripping hydrocarbons from the water.

As is obvious from these representative processes, they require considerable hardware and constant monitoring to ensure that operating conditions are within the proper parameters. Moreover, it is difficult to ascertain whether the treatment process adequately reduces the amount of hydrocarbons in all the water flowing through the system. This is because periodic samplings of the effluent merely reflect the condition of that portion of the flowing treated water at the time the sample was collected. They do not provide a precise reading of the amount of contaminants present in all of the water flowing through the process apparatus. Further, the processes require provisions for a holding tank to maintain constant liquid flow and/or a recovery tank for receiving the treated water, which further contributes to the cost of the installation.

It would be desirable to be able to treat water containing hydrocarbons in a simpler, yet effective way, so as to not only remove and recover hydrocarbons to a point where the remaining water is at an acceptable level, but to do so in a manner which assures that the entire output of the process is adequately clean. It would also be desirable for such a process to be relatively inexpensive and simple to operate.

BRIEF SUMMARY OF THE INVENTION

In accordance with the invention, water containing dissolved or entrained hydrocarbons is introduced into a holding tank and bubbles of inert gas or air are introduced into the water in the holding tank directly to strip hydrocarbons therefrom. The resulting vapor, comprised of inert gas or air and stripped hydrocarbons, is vented from the tank. Contrary to continuous treatment systems, the hydrocarbon/water mixture is not in a state of continuous flow while the gas bubbles are introduced, but is prevented from exiting the tank during that time. The inert gas or air is introduced at a relatively low rate. The low air flow rate and the controlled exhaust of the vapor, which limits any safety or environmental concerns that may otherwise have been raised due to the use of air, allows air to be employed in the invention. Other process parameters, such as the size of the bubbles and the temperature of the water, may be controlled to increase the efficiency of the process. The method is capable of producing effluent which contains such low quantities of hydrocarbons that the effluent is not considered to be hazardous waste. The hydrocarbon and water vapors can be generated at low enough rates to be processed through conventional hydrocarbon vapor recovery systems and returned to storage.

The invention lends itself for use with conventional water collection tanks of the type which receive water from oil/water separators, which operate intermittently and do not lend themselves to direct treatment levels. If desired, two tanks may be employed, one to receive incoming hydrocarbon/water mixtures while such mixtures in the other filled tank continue to be treated. The manner in which a two-tank system is operated is described in more detail hereinafter.

The features of the invention which enable it to function in the desired manner are brought out in more detail below in connection with the description of the preferred embodiment, wherein the above and other aspects of the invention, as well as other benefits, will readily be apparent.

BRIEF DESCRIPTION OF THE FIGURE

The single FIGURE of the drawing is a longitudinal sectional view of a dual tank arrangement employed in carrying out the method of the invention, including a schematic representation of various other stations utilized in the method.

DETAILED DESCRIPTION OF THE PREFERRED EMBODIMENT

Referring to the drawing, a water collection vessel 10 is comprised of end walls 12 connected to top and bottom walls 14 an 16. Side walls 18 are connected at their midpoint by a vertical bulkhead 20 which extends from the top wall to the bottom wall to divide the vessel into two separate tanks C1 and C2. Each tank is fitted with identical hardware to allow hydrocarbon/water mixtures to be treated in the same manner in each one. Thus inlet pipes 22 and 24, containing shut-off valves 26 and 28, respectively, connect with the top wall 14 on opposite sides of the bulkhead 20 to permit hydrocarbon/water mixtures to be introduced into the tanks. Vent pipes 30 and 32, containing check valves 31 and 33, respectively, are also connected to the tanks through the top wall 14 so as to vent each tank. In addition, outlet pipes 34 and 36, containing shut-off valves 38 and 40, respectively, connect with the end walls 12 to permit treated water to exit the tanks. The inlet pipes 22 and 24 are connected to a main conduit or header 42 which is connected to a source of hydrocarbon/water mixture 44, while the vents 30 and 32 are connected through header 46 to a vapor recovery unit 48. The inlet piping is sloped to ensure that they remain empty when not transferring material.

Each tank C1 and C2 also contains a heater 50 and an air sparge element 52 near the bottom wall of the tanks. Each air sparge element is connected by air lines 54 which extend through the top wall 14 to a manifold 56, which in turn is connected by an air line 58 to a source of compressed air 60.

In operation, hydrocarbon/water mixtures are introduced to tank C1 through inlet pipe 22 from the source 44. The hydrocarbon/water mixture may come from any number of different sources, such as oil/water separator tanks, storage tank bottoms, trench drains, loading racks, various types of vapor recovery units, and other sources. The block diagram 44 is meant to be generic to any and all sources of such mixtures.

Compressed air may be delivered to tank C1 through line 54 and air sparge element 52 at any time after the influent has covered the element, either while the tank is still filling or after it has been completely filled. The shut-off valve 38 in the outlet pipe 34 would of course be closed while the tank is filling. The air bubbles emitted from the air sparge element 52 may be of varying size. Because smaller bubbles from a given rate of air flow will contact a greater surface area of the contaminated water than would larger bubbles, greater efficiency in stripping dissolved or entrained hydrocarbon compounds from the water can be obtained through use of smaller rather than larger air bubbles. The size of the bubbles is controlled by the size of the openings in the element 52. Bubbles of relatively large size typically are produced by emitting the air through outlet holes of predetermined size in the sparge element, while smaller bubbles can be produced through use of a so-called porous sparger wherein the compressed air is forced through a mesh screen. The sparge element may consist merely of a plastic or metal tube containing drilled holes when producing large bubbles, while porous spargers are readily commercially available, such as, for example, through Mott Mettalurgical Corporation of Farmington, Conn., preferably Part No. 1400-.750-.625-12-10. Although the sparger has been described in connection with the introduction of compressed air, it will be understood that inert gases, such as nitrogen, may be used as well. The use of the term "compressed air" in the description of the invention, therefore, will be used as a term of convenience to refer to both compressed air and compressed inert gases.

Compressed air may be introduced to tank C1 while the tank is filling or after it has been filled. In either case, hydrocarbons will be stripped from the influent hydrocarbon/water mixture, and both water vapor and the stripped hydrocarbon vapor will exhaust through the vent 30. When tank C1 has been filled, the valve 26 is closed and the valve 28 leading to tank C2 is opened. Influent will then flow into tank C2 and begin to fill the tank, with the outlet valve 40 being closed. For purpose of illustration, the tank C1 is shown as being filled and the tank C2 is shown as being empty. If the stripping process in tank C1 is carried out while the tank C1 is filling, by the time tank C1 is completely filled the hydrocarbon level in the water in the tank will have been so lowered by the ongoing stripping process that the desired reduction of the hydrocarbon level may already have been reached or will be near to being reached. If the stripping process is not started until tank C1 has been filled, a longer period of time thereafter would be required to reach the desired level of hydrocarbons in the water. Thus while tank C2 is being filled, the stripping process in tank C1 may or may not be taking place. When the level of hydrocarbons in the water in tank C1 has been reduced to the target level, the outlet valve 38 is opened and the treated water permitted to flow out of the tank to a system compatible for the site, not shown. Discharge to a local publicly owned treatment works or to a receiving stream are examples of possible discharge scenarios. The same procedure is then followed in tank C2, with contaminated water again being introduced into tank C1 after tank C2 has been filled. The check valves 31 and 33 in vent lines 30 and 32 prevent backflow of hydrocarbon vapors from a tank being filled with a hydrocarbon/water mixture to the other tank. Thus there is no risk of exposing clean stripped water from the other tank to hydrocarbons from the first tank.

By treating a finite volume of non-flowing water in a tank rather than treating a continuous flow of water, the amount of hydrocarbons in the water can be accurately determined prior to releasing purified water from the tank. A precise hydrocarbon measurement of water treated by the method of the present invention is thus possible rather than only a representative level based on periodic measurements of water continuously flowing through the process apparatus.

The rate of flow of compressed air into the hydrocarbon/water mixture may vary depending on the process parameters, including tank size and the desired duration of the process for each tank. In general, however, air flow is much less for the present invention than in a process in which continually flowing water is treated. In the latter process air flow rates of about 40 to 200 cubic feet per minute (cfm) are common because of the relatively short contact time of the air with the flowing water. In the present invention, however, much lesser flows are required to adequately strip hydrocarbons from the water. Although extremely low air flows will eventually adequately strip a sufficient quantity of hydrocarbons to meet the desired maximum allowable amount, flows of at least 2 cfm and preferably between 5 cfm and 10 cfm are recommended for economical processing. For example, for a tank holding 10,000 gallons of water using an air sparger to deliver air bubbles, and based on an 80% efficient single stage contact of the air with the water, a flow of only 5 cfm at a temperature of 80° F. will strip benzene from a level of 500 parts per million (ppm) to 0.5 ppm in six days. A flow of 7.5 cfm will accomplish the same stripping in four days.

In general, air flows ranging from about 5 cfm to about 10 cfm are preferred in order to carry out the stripping operation over a reasonable period of time while not exceeding the amount of saturated hydrocarbon vapor that the vapor recovery unit can handle. For example, if the vapor recovery process utilizes a refrigeration unit, excessive amounts of hydrocarbon/water vapor delivered to it will cause unwanted additional defrost cycles in existing units or require more expensive larger units to be used.

As mentioned above, the efficiency of the operation increases as the temperature of the water is increased. For this reason the heaters 50 are provided. Again, there is no definite minimum temperature at which the process must be carried out. However, in order to complete the purification of a tank of water within a reasonable period of time, say within 5-7 days for a volume of 10,000 gallons, it is preferred that the water be kept at a temperature of at least 70° F. The effect of temperature on the rate of hydrocarbon component removal is significant. For example, to attain a 95% rate of benzene removal from 10,000 gallons of mix at 7.5 cfm air flow would take about 95 hours at 50° F., 55 hours at 70° F. and 30 hours at 90° F. It would not be economically practicable to heat the water to too high a temperature, nor would it be practical to heat the water to such a degree that the boiling point of water or that of the various hydrocarbons in the water is reached. Some hydrocarbons have boiling points at or above that of water. For these reasons it is preferred that the temperature of the water not exceed 100° F. The heaters employed may be of any desired type, such as commonly available electric immersion heaters enclosed in a pipe inside the tank to avoid inadvertent static emissions into the tank. It has been found that an electric heater rated at 3-5 kilowatts is adequate for 10,000 to 12,000 gallon insulated tanks.

Another variable of the process is the volume of the hydrocarbon/water mixture in the tank. Given the same air flow and temperature conditions, a smaller charge of material will take less time to be purified than a larger charge. This varies at a linear rate. Thus an 8,000 gallon charge would take only 80% as long to reach the desired level of purification as a 10,000 gallon charge.

The stripping operation of the invention and the various parameters discussed above are based on a continuous stripping operation. Compressed air is therefore to be delivered continuously to the tank during the stripping operation.

As mentioned previously, the size of the air bubbles affects the efficiency of the operation, with smaller bubbles being more efficient than larger bubbles. To give a better idea of the impact of bubble size on the method, the efficiency of the stripping process using very small bubbles, of 1/32 inch to ⅛ inch size coming from a porous metal sparger of 10 micron size, has been compared to the stripping efficiency when using relatively large bubbles, of a size produced by ¼ inch openings in an air discharge pipe. It has been found that the efficiency, with all other conditions being equal, ranges from over 80% when using the minimum size bubbles to about 70% when using the larger size bubbles.

If the stripping process is begun while the tank is filling, a certain minimum volume of material should be present to enable the air to be bubbled through the material. For a 10,000 gallon tank this minimum quantity may be in the order of 200 to 500 gallons, depending upon the volume of material needed to fully submerge the heating element and sparger in the tank.

The extent of purification possible with the present invention will vary. It is quite possible, however, to lower the hydrocarbon content to extremely low amounts. For example, the level of benzene has been reduced to as low as 0.05 ppm through use of the present method.

In summary, the invention provides a simple method of removing and recovering hydrocarbons from hydrocarbon/water mixtures by stripping in accordance with the method described. The method enables stripping to take place in collection tanks, thereby eliminating the need for costly additional equipment. The treated water resulting from the process can be readily disposed of without further treatment. Hydrocarbons exhausting from the tank in the form of vapor can readily be recovered in conventional adsorption units or by conventional refrigeration units, returning valued products for sale or reuse. In addition, the level of purification resulting from the method is guaranteed, since samples taken from the tank for testing accurately represent the condition of the water in the tank at that time.

It should now be appreciated after reading the foregoing description that the invention need not necessarily be limited to all the specific details described in connection with the preferred embodiment, but that changes to certain features which do not alter the overall basic function and concept of the invention may be made without departing from the spirit and scope of the invention defined in the claims.

What is claimed is:

1. A method of removing dissolved or entrained hydrocarbons from hydrocarbon/water mixtures, comprising the steps of:

introducing a hydrocarbon/water mixture into a closed tank;

preventing the mixture from exiting the tank;

introducing bubbles of inert gas or air into the mixture in the tank at a rate in the range of about 2 to 10 cubic feet per minute to strip hydrocarbons therefrom;

venting vapor from the tank to a vapor recovery unit, the vapor comprising the inert gas or air and stripped hydrocarbons, so as to recover hydrocarbons therefrom;

introducing another hydrocarbon/water mixture into a second closed tank while hydrocarbons are being stripped from the mixture in the first-mentioned tank;

preventing the mixture in the second tank from exiting;

introducing bubbles of inert gas or air into the mixture in the second tank at a rate in the range of about 2 to 10 cubic feet per minute while draining treated water from the first tank; and venting vapor from the second tank to said vapor recovery unit.

* * * * *